Patented Jan. 19, 1943

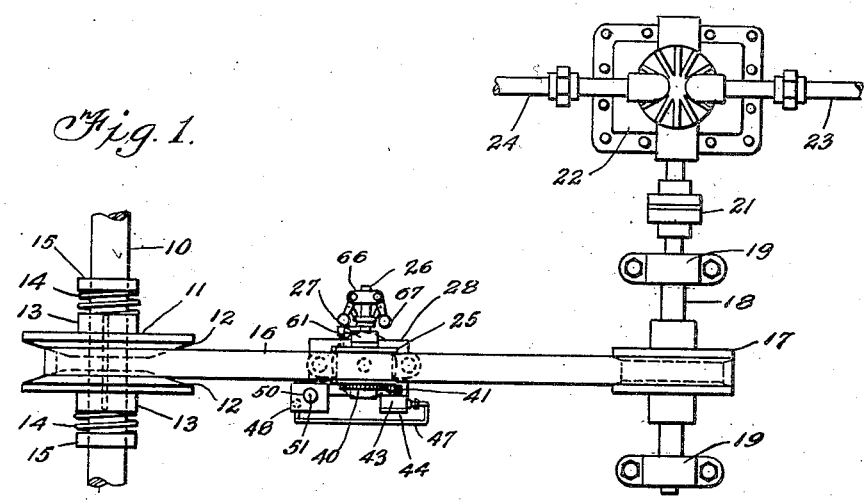

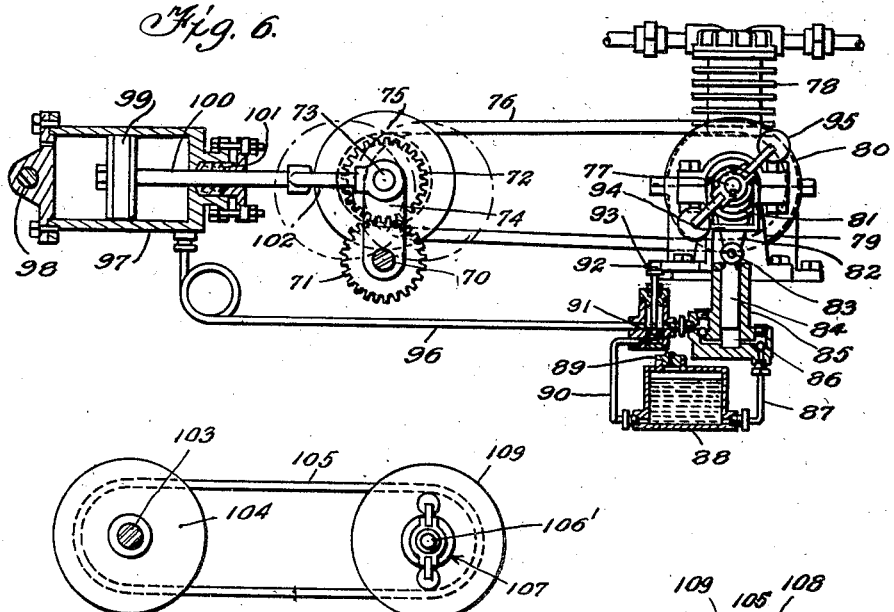

2,308,868

UNITED STATES PATENT OFFICE 2,308,868

POWER TRANSMISSION SYSTEM

Augustus C. Durdin, Jr., Chicago, Ill.

Application July 8, 1938, Serial No. 218,114

20 Claims. (Cl. 74—230.17)

The present invention relates to power transmission systems and has for its general object the provision of a system in which a driven member is maintained at a substantially constant speed irrespective of variations in speed of a driving member.

While the present invention is directed generally to systems in which power is transmitted from a variable speed driving member to a member to be driven at a constant speed, it is more specifically directed to systems in which a variable speed railway car wheel axle or vehicle motor is connected to a constant speed compressor utilized in air conditioning the railway car or motor vehicle. Consequently, the specific embodiments of the invention to be described hereinafter have been illustrated in connection with this type of equipment. When a constant speed compressor unit is driven from a wheel axle, the axle is ordinarily provided with a driving pulley adapted to drive the compressor through a driven pulley. The pulleys are interconnected through a variable speed-ratio transmission, usually either of the friction or electromagnetic type. These transmissions have the disadvantage that at higher speeds, say, when the train is moving at 90 miles per hour, the power required to drive the compressor at its normal speed is approximately twice as great as the power required to drive it at the same speed when the train is moving at 45 miles an hour, which speed may be considered—for the purpose of illustration—as the normal speed and the speed at which the maximum efficiency of transmission is obtainable. The increased power required to drive the compressor at the higher train speed results from the fact that the torque necessary to drive the compressor is then obtained from a shaft rotating at twice the speed at which maximum efficiency is obtainable. This disadvantage may be overcome by using a power transmission in which the ratio of the diameters of the driving and driven members is varied to avoid slippage between the shafts.

The present invention is directed to a new and improved power transmission system of this type. In its preferred form it comprises a pair of pulleys, one of which is of the variable diameter type, interconnected by a belt or the like and a centrifugally controlled fluid pressure generating means adapted to regulate the effective diameter of the variable diameter pulley.

The primary object of the present invention is to provide a new and improved fluid pressure actuated, centrifugally controlled power transmission system.

A further object of the invention is to provide a power transmission system with a new and improved centrifugally controlled means for regulating the speed ratio of interconnected driving and driven members.

A further object of the invention is to provide a power transmission system of the type described with a speed regulating means comprising fluid pressure generating means, a power transmission member controlled thereby, and valve means centrifugally controlled in response to the speed of a driven member of the system for controlling the effect of the fluid pressure means on the controlled power transmission member.

A further object of the invention is to provide a power transmission system comprising a pair of pulleys, one of which is of the variable diameter type, interconnected by a belt, or the like, with a centrifugally controlled speed-ratio regulating means constructed and supported independently of the drive proper and adapted to engage only the belt and which is capable of varying the effective diameter of the variable diameter pulley by varying the force applied to the belt.

A further object of the invention is a power transmission system in which the speed ratio of the driving and driven members is controlled by a unit which may be constructed separate from the power system and installed in new or existing systems with a minimum of effort and expense.

A further object of the invention is to provide a power transmission system in which the speed ratio of the driving and driven members is controlled by means of the type referred to above that is adapted to vary the position of one of said members with respect to the other.

A still further object of the invention is to provide a power transmission system comprising a pair of variable diameter pulleys, the diameter of one of which is varied by fluid pressure actuated centrifugally controlled means and that of the other by the tension of the belt.

Other objects and advantages of the apparatus will become more apparent from the ensuing description in the course of which reference is had to the accompanying drawings, in which:

Fig. 1 is a top plan view of a preferred form of the present invention illustrated in conjunction with the drive of a constant speed compressor unit from a variable speed driven shaft;

Fig. 2 is a side elevation view of the apparatus shown in Fig. 1;

Fig. 3 is an enlarged longitudinal elevation view, partly in section, of the speed-ratio regulating unit of the present invention;

Fig. 4 is an end elevation of the unit shown in Fig. 3;

Fig. 5 is a perspective view of the base plate of the unit illustrated in the previous figures, illustrating in detail the positions of the various oil ducts;

Fig. 6 is a side elevation, partly in section, of a modified form of the present invention;

Fig. 7 is a diagrammatic side elevation view of a further modification of the invention with parts thereof omitted for the sake of clarity; and Fig. 8 is a fragmentary longitudinal vertical sectional view through the driving shaft and speed-ratio varying means of the system illustrated in Fig. 7.

Fig. 9 is a fragmentary view showing in detail the valve and governor control mechanism of the embodiment shown in Fig. 6.

Referring now more specifically to Figs. 1 to 5, inclusive, of the drawings, reference numeral 10 indicates a variable speed driving shaft such as a railway car wheel axle or the power take-off shaft of a motor truck transmission. The speed of rotation of this shaft is variable because of the variation in the rate of travel of the car or truck. A driving pulley 11 of the variable diameter type comprising two pulley halves 12 is mounted for rotation with the shaft 10. The pulley halves are each provided with hubs 13 slidable on the shaft but splined to the latter so as to transmit power applied to shaft 10. The pulley halves are resiliently biased toward each other (i. e., to the maximum diameter position) by a pair of compression springs 14 abutting at their inner ends against the hubs 13 and at their outer ends against collars 15 adjustably secured in suitable manner to the shaft 10.

The transmission of power from the drive shaft 10 is accomplished preferably, but not necessarily, through a standard V-belt interconnecting the driving pulley 11 to a constant diameter driven pulley 17. The driven pulley is fixedly attached to a driven shaft 18 which is journaled for rotation in a pair of spaced apart bearing housings 19 supported upon bearing brackets 20 (see Fig. 2). The driven shaft is coupled by a coupling 21, of any standard type, to a compressor unit 22 of the constant speed type ordinarily used in mechanical refrigeration. For purpose of illustration, the compressor intake has been illustrated by reference numeral 23 and the outlet by reference numeral 24.

The variable speed-ratio means of the present invention also comprises an idler pulley 25 rotatably mounted upon a relatively short shaft 26 mounted directly underneath the upper segment of the V-belt 16, as clearly illustrated in Fig. 2. The pulley bears against the under side of the belt with a force determined by control means described hereinafter. An advantage resulting from locating the pulley beneath the upper segment of the belt is that the belt fibres are always stressed in the same direction by both the idler pulley and the driving and driven pulleys. The life of the belt is thereby extended. The pulley shaft 26 is journaled for rotation in a pair of bearing brackets 27 secured by means of screws or the like to a vertically movable and substantially horizontally disposed bed plate 28.

The position of the bed plate and the idler pulley 25, and, consequently the pressure applied to the belt, is controlled by means of a vertically disposed piston rod 29 extending into the confines of a cylinder 30. The upper end of the cylinder is adapted to be closed by an apertured cylinder head 31 removably secured to the cylinder by means of a plurality of cap screws 32. The lower end of the piston has attached thereto a piston rod 33, a leather sealing cup 34 and a follower 35. These are all secured to the piston rod by means of a retaining nut 36.

The piston and bed plate are guided in their movements by a pair of guides 37 formed integrally with and at opposite sides of the cylinder. The guides are apertured to receive a pair of guide rods 38 secured to the lower side of the bed plate 28 by retaining nuts 39.

The power necessary to generate the fluid pressure required adjustably to position the bed plate and the idler pulley is derived from the drive shaft and belt through a spur gear 40 mounted on shaft 26 adjacent the idler pulley. Gear 40 meshes with a driving pinion 41 mounted at the end of a gear pump shaft 42. The gear pump is enclosed within a suitable housing 43 provided with a removable end wall 44 through which access may be had to the co-operatively associated gear pump members 45 and 46 which are adapted, when rotated, to furnish the fluid pressure necessary for proper operation of the system. While a pump of the type to be described is a preferred source of power it should be understood that in its broader aspects the present invention may be utilized with other sources of power. For instance, the source of power might very well be a pressure tank and an associated independently driven compressor, or the like.

The inlet port of the gear pump is connected by a conduit 47 to an oil reservoir 48 which is, like the gear pump, supported upon the base plate 28. The reservoir may be filled with any suitable fluid such as oil or water or, if desired, a gaseous medium may be used as the actuating fluid.

The reservoir may be filled with the fluid which, for the purpose of illustration, is assumed to be oil, through an opening 49 adapted to be closed with a cap 50 provided with a breather opening 51.

The outlet port of the gear pump is connected by a duct 52 to a horizontally disposed duct 53 formed in the bed plate. The latter duct may be conveniently formed by a drilling operation and the open end of the duct may be closed by a suitable plug. Excess oil is returned to the reservoir through a vertically disposed branch or by-pass duct 54 extending upwardly from the duct 53 to the bottom of the oil reservoir. The pressure generated by the gear pump is applied to the underside of the piston through a vertical duct 55 extending from the duct 53 to the underside of the piston through the piston rod 29.

The pressure to which the piston is subjected is controlled in a manner more specifically described hereinafter by centrifugal means rotating at a speed proportional to the speed of the driven member so as to maintain the speed of the latter substantially constant, irrespective of variations in speed of the driving member. This pressure control is effected through a control of the amount of oil permitted to flow from the outlet side of the oil pump to the reservoir through the duct 53 and the by-pass duct 54. The amount of oil by-passed from the outlet of the pump to the reservoir is governed by a valve 56 slidably mounted in a valve chamber 57. The leakage of oil along the valve stem 58 is prevented by a suitable stuffing box 59.

In order to provide an arrangement whereby the driving pulley is maintained at its maximum diameter while the apparatus is at rest and the diameter is gradually decreased as the speed of the driving shaft increases above a predetermined value at which the driven member rotates at its normal speed, the bypass valve is biased to its open position by a spring 60 bearing against the side of the bed plate and an actuating lever 61 mounted upon a rock shaft 62. The rock shaft is rotatably mounted upon a bearing block 63 supported by one of the bearing brackets 27.

The position of the valve is controlled by centrifugal means acting upon the rock shaft 62 through a yoke 64 co-operatively associated at its upper end with a collar 65 movable longitudinally of the shaft 26. The shaft 26 is provided with a fixedly mounted collar 66 upon which are mounted the diametrically opposed governor arms and balls 67 pivotally connected directly to the fixed collar and by means of linkage members 68 to the slidable collar.

In order that the movable mechanism of the speed-ratio controlling means described above may perform its function without interfering with the movement of the belt, the belt length may be increased somewhat as indicated in Fig. 2 so that the major portion of the controlling means lies between the upper and lower segments of the belt. The control means, which is seen to comprise an integral unit, is best supported at one side of the belt by a bracket 69. The bracket may be secured to suitable supporting structure either independent of the structure supporting the compressor or upon the same base 69', as illustrated clearly in Fig. 2.

In the description of the operation, it is assumed first that the driving shaft and, therefore, the remainder of the mechanism thus far described are at rest. At this time the governor balls 67 lie nearest the axis of the shaft 26 and consequently the valve controlling the passage of fluid from the gear pump directly to the fluid reservoir is open. The piston 33 is at its lowermost position and the pressure applied to the belt a minimum. Consequently, the two halves 12 of the variable diameter driving pulley are nearest each other. When the driving shaft 10 is rotated, the driving pulley rotates and it drives the driven pulley 17 through the belt. The belt rotates the idler pulley and its supporting shaft and consequently the pump is operated. However, since the bypass conduit is open, as a result of the valve 56 being biased to its open position, no pressure is applied by the idler pulley to the belt. Consequently, the drive of the driven shaft is initiated at the highest speed ratio because the driving pulley is at its maximum effective diameter position. When the speed of the driven shaft, and likewise the peripheral speed of the belt, which is proportional to the speed of the driven shaft, reaches its normal operating speed the centrifugal force of the governor balls overcomes the bias of the valve spring, thereby partially closing the valve. The partial closure of the valve results in the application of pressure to the under side of piston 33, whereby the piston is raised and pressure applied to the belt. The belt is moved upwardly and the halves 12 of the driving pulley forced apart against the force of the biasing springs to decrease the effective diameter of the belt. As the speed of the driving shaft increases, the valve is gradually closed to apply increasing pressures to the belt further to reduce the diameter of the driving pulley so as to maintain the speed of the drive member substantially constant.

When the speed of the driving member decreases, the valve is returned toward its open position by the spring. The pressure applied to the belt is reduced and the effective diameter of the driving pulley increased, again to maintain the speed of the driven member substantially constant.

It may be well to mention at this point that when the driving member is rotating below a speed at which the centrifugal force of the governor balls is insufficient to overcome the bias of the valve spring, the driven member is rotated at a speed proportional to the speed of the driving member. However, when the speed of the driven member reaches its normal operating speed, the centrifugal force overcomes the bias and effects gradual closure of the valve as the speed of the driving members increases, as fully explained above. When the speed of the driving member increases to or above a value at which the valve is in its fully closed position, then the speed of the driven member is again proportional to the speed of the driving member. It should be apparent to those skilled in the art that the range in speed of the driving member in which the control is effective to maintain the speed of the driving member substantially constant as well as the predetermined speed at which the driven member is to be rotated may be varied to meet the requirements of different installations by suitably designing the component parts of the system.

In so far as principles of operation and construction are concerned, the modification of the invention illustrated in Figs. 6 and 9 is substantially the same as that of the previously described modification. In distinction therefrom, it may be stated briefly that the centrifugal governing and fluid pressure generating means are driven directly by the driven member, instead of by the belt, and the diameter of the variable diameter driving pulley is controlled by varying the position of the axis of rotation of the latter with respect to the axis of rotation of the driven pulley. The driving member which may be either a driven shaft or a car wheel axle, as in the previously described modification, is indicated by the reference numeral 70. Keyed to this shaft is a driving gear 71 meshing with a gear 72 keyed to a jack shaft 73. The jack shaft is maintained parallel and equidistant to the drive shaft 70 by a pair of parallel linkage members 74.

The driving pulley 75, similar to the previously described driving pulley, is connected by a standard V-belt to a driven shaft 77 coupled directly to a constant speed compressor 78 or other piece of equipment. The shaft 77 may be rotatably supported in a plurality of bearing brackets 79 (only one of which is shown in Fig. 6). On it is mounted the fixed diameter driven pulley 80.

In the present modification, the fluid pressure generating means is of the type that operates satisfactorily irrespective of the direction of rotation of its actuating shaft. A generating means of this type is one comprising a reciprocating piston. In the instant illustration an eccentric 81, mounted for rotation with the driven shaft 77, is connected by a pitman 82 and a pivotal connection 83 to the plunger 84 of the oil pump. The plunger is slidably mounted within a pump cylinder 85 provided with an inlet check valve 86 controlling the supply of oil flowing to the pump through supply line 87 and oil reservoir 88. The reservoir is closed by a combined cap and breather 89.

The oil reservoir is connected to the outlet port of the oil pump by a bypass conduit 90 having interposed therein a valve 91 biased by spring means 91' to its open position and actuated by centrifugal means rotated by the driven member. The valve is provided with an extension connected to an actuating lever 92 rotatably mounted upon a rock shaft 93. The rock shaft is rotated by a yoke 94 in turn adapted to be moved longitudinally of the driven shaft 77 by a sliding collar 77'. The sliding collar is moved along the shaft by a suitable centrifugal mechanism comprising the governor balls 95.

The outlet port of the oil pump is connected through a conduit 96 to a control cylinder 97 pivotally mounted upon a suitable supporting structure 98. Within the cylinder is mounted a piston 99 connected by a piston rod 100 to a yoke 102 pivotally connected to the jack shaft 73. Leakage of oil along the piston rod 100 is prevented by a stuffing block 101.

In this modification the compression springs associated with the driven pulley 80 normally bias the pulley halves together so os to maintain the pulley in its maximum diameter position. The spring bias moves the jack shaft 73 clockwise about the driving shaft 70 and the piston 99 toward the right end of the cylinder, as viewed in Fig. 6. The bypass valve 91 is normally in its open position although in Fig. 6 it has been illustrated more nearly in its closed position, which is the position it occupies when the jack shaft has been moved to an intermediate position along its path of movement. The dotted lines in Fig. 6 indicate the extreme positions of the pulley.

The operation of the present modification is substantially the same as that of the one previously described except that the system is operative irrespective of the direction of rotation and that the effective diameter of the driving pulley is controlled by varying the distance between the axes of rotation of the pulleys 75 and 80.

It should be apparent to those skilled in the art that the advantages of this modification may be utilized in connection with the previously described modification.

In the modification of the invention illustrated in Figs. 7 and 8 an increased range of speed of the driving member is compensated for by making both the driving and driven pulleys of the variable diameter type. These are so arranged that the driven member can be driven at a speed many times that of the driving member. One of the two pulleys is of the type comprising two pulley halves biased toward each other by springs, and the other is so constructed that the position of the two pulley halves is determined by the belt tension and the force applied to the halves by centrifugally controlled pressure generating means.

Referring now specifically to Figs. 7 and 8, it may be seen that the driving shaft, which may be rotated by a suitable prime mover, is indicated by reference numeral 103. On it is mounted a variable diameter pulley 104 of the type having its opposed halves biased for movement toward each other by a pair of compression springs just as the pulley 11 of the first described embodiment. A V-belt 105 interconnects the driving pulley and a driven pulley 107 comprising a pair of pulley halves 108 and 109 that are relatively movable with respect to each other in a manner to be described shortly. The driven pulley is mounted a driven shaft 106 adapted to be coupled to constant speed equipment by a coupling member 110.

The driven pulley and the speed-ratio varying means associated therewith are mounted for rotation in a pair of spaced apart bearing brackets 111. The driven shaft 106 is provided with an annular flange 112 so as to receive one end of an intermediate tubular shaft section 113 to the other end of which is secured a tubular shaft extension 106'. The driven shaft proper 106, intermediate section 113, and the extension 106' are made to rotate as a single unit by interconnecting the shaft and intermediate section by a key 114 and the intermediate section and the extension by screws 125 extending through the intermediate section into a block 124 formed integrally with the extension.

The two halves 108 and 109 of the driven pulley are slidably splined to the exterior of intermediate section 113. In the interior of the section is slidably mounted a cylinder 115 connected by radially disposed pins 116, a collar 117 surrounding shaft section 113, and axially disposed rods 118 to pulley half 109 in such manner that the two move as a unit. Slidably mounted within cylinder 115 and movable as a unit with the other pulley half 108 is a piston 119 suitably secured to a piston rod 120. Within the piston is a duct 120' providing a fluid passage from the interior of the cylinder to the outlet of the fluid pressure generating means to be described hereinafter.

The connection of the piston 119 to pulley half 108 is made through concentric slidable collars 121 and 122 located within and without the intermediate shaft section 113 and axially disposed rods 123, passing through suitable apertures in pulley half 109.

The pressure generating means comprises an eccentric 126 rotatable with the driven shaft and connected by a pitman 127 to a reciprocable plunger 128. The plunger is reciprocated within a cylinder 129 provided with intake and discharge check valves 130 and 131, respectively. The intake of the pump is connected by a conduit 132 to the fluid reservoir 133 closed by a cap 134.

The fluid pressure tending to force the pulley halves 108 and 109 toward each other is controlled by a normally open valve 135 located within a valve housing 136. The valve controls, as in the previously described modifications, the flow of fluid through a bypass conduit 137. The outlet side of the pump is connected to the cylinder 115 through the previously mentioned hollow piston rod 120, a conduit 138, and coupling device 139. To permit ready movement of the piston rod 120, the conduit 138 has interposed in it a coil 140.

The centrifugally actuated control comprises a sleeve 141 slidably mounted on shaft extension 106'. The latter also supports a fixed collar 142 upon which is pivotally mounted a pair of governor balls 143 pivotally connected to the slidable collar 141. The slidable collar is connected to the valve 135 through a yoke 144, linkage mechanism 145, and an elongated valve stem 146. The governor mechanism may be biased to normal position by a compression spring 147.

The principles of operation of this device are similar to those of the previously described embodiments of the invention. When the system is at rest, the valve 135 is in its fully open position. As a result, the pressure tending to force apart cylinder 115 and piston 119 is at a minimum so that the pulley halves are forced apart to their minimum diameter position by the tension exerted on the belt by the compression springs biasing the halves of the driving pulley to a maximum diameter position. Then when the driving shaft is rotated, the driven shaft is rotated at a speed ratio greater than one because the maximum diameter of the driving pulley is greater than the minimum diameter of the driven pulley. As the speed of the driving member increases, the driven member is driven at a speed proportional to the speed of the driving member until the driven shaft exceeds its normal speed. Thereafter, as the speed of the driving member continues to increase, the centrifugal control effects gradual closure of the bypass valve 135, gradually to apply an increasing pressure tending to force together the pulley halves 108 and 109. This force gradually overcomes the force of the belt tending to force the halves apart, and as a result, the diameter of the driven pulley is increased. The belt has a fixed length so that an increase in the size of one pulley effects a corresponding decrease in the size of the other. Consequently, the increase in the size of the driven pulley is accompanied by a decrease in the size of the driving pulley. As the speed of the driving pulley increases, and the speed of the driven pulley tends to exceed its predetermined normal value, the speed ratio is decreased until the driving pulley is in its minimum diameter position and the driven pulley in its maximum diameter position. If the speed of the driving member increases above a point at which the valve is fully closed then, as in the previously described modifications, the speed of the driven member again becomes proportional to the speed of the driving member.

Upon a decrease in speed, just the opposite results are obtained. Therefore, the driven member is rotated at a substantially constant speed, irrespective of the variations in speed of the driving member.

It is contemplated that numerous changes may be made in the specific embodiments described above without departing from the spirit of the present invention. For instance, it should be understood that the physical constants of the various elements may be modified to meet the varying requirements of diverse applications. Likewise, it may be desirable in some instances to connect the centrifugal control to the driven member through suitable gears or to operate the pressure generating means through gears instead of by an eccentric mounted upon the driven shaft. Furthermore, it is possible to reverse the direction of operation of the valve and its actuating means, so that the valve is normally closed instead of open. Other changes may well occur to those skilled in the art and, therefore, the invention is not to be restricted except by the appended claims.

What I claim as new and desire to secure by Letters Patent is:

1. In combination, a varying speed driving member, a member to be driven at a substantially constant speed, variable speed-ratio means interconnecting said members and resiliently biased to a high speed-ratio position, and means adapted automatically to control the speed-ratio of said last mentioned means whereby said driven member is driven at substantially a constant speed irrespective of variations in the speed of the driving member, said last mentioned means including a pump operated by power derived from the driving member and operable only when the driving member is rotated, fluid pressure operated means connected to the outlet of the pump and actuable solely by pressure developed by said pump and operating against the biasing force to vary the speed-ratio of said variable speed-ratio means, and valve means responsive to the speed of the driven member for controlling the pressure applied to said pressure operated means.

2. In a power transmission system, the combination including, a varying speed driving member, a member to be driven at a substantially constant speed, variable speed-ratio means interconnecting said members, and means adapted automatically to control the speed ratio of said last mentioned means whereby said driven member is driven at a substantially constant speed irrespective of variations in the speed of the driving member, said last mentioned means including fluid pressure generating means operated by power derived from the driving member, pressure operated means controlling said variable speed-ratio means, variable position valve means interposed between said pressure generating and pressure operated means for varying the pressure applied to said pressure operated means, and centrifugally operated means operating at a speed proportional to that of the driven member for controlling the position of said valve.

3. In a power transmission system, the combination including, a varying speed driving member, a member to be driven at a substantially constant speed, a variable diameter pulley of the type including a pair of pulley halves resiliently biased toward a maximum diameter position mounted on one of said members, means interconnecting said members through said pulley for the transmission of power from one to the other, fluid pressure generating means, means for operating said pressure generating means by power derived from the driving member, pressure operated means adapted to vary the distance between the pulley halves against the biasing force for varying the speed ratio between said driving and driven members, valve means interposed between said pressure generating and pressure operated means for varying the pressure applied to the latter means, and centrifugally operated means operating at a speed proportional to that of the driven member adapted to control said valve means for maintaining the speed of the driven member substantially constant.

4. In a power transmission system, the combination including, a varying speed driving member, a member to be driven at a substantially constant speed, a variable diameter pulley of the type including a pair of pulley halves resiliently biased toward a maximum diameter position mounted on one of said members, a belt interconnecting said members through said pulley for the transmission of power from one to the other, a fluid pressure generating pump having suction and outlet ports, means for operating said pump by power derived from the driving member, a cylinder and an associated piston relatively movable to move said pulley halves against the biasing force for varying the diameter of said pulley and thereby the speed ratio between the driving and driven members, a fluid conduit leading from the outlet port of said pump to the cylinder, a fluid reservoir, a fluid conduit connecting said reservoir to the suction port of said pump, a bypass conduit connecting the outlet port of said pump to the fluid reservoir, a valve means controlling the flow of fluid through said bypass conduit, and centrifugally operated means operating at a speed proportional to that of the driven member adapted to control said valve means whereby the pressure applied to said piston is varied to maintain the speed of the driven member substantially constant irrespective of the variations in the speed of the driving member.

5. In combination, a driving member, a driven member, variable speed-ratio means interconnecting said members, and means including fluid pressure generating means and centrifugally controlled valve means actuated by and acting upon said last mentioned means for controlling the speed ratio.

6. In combination, a driving member, a driven member, a flexible driving connection interconnecting said members for transmitting power from one of said members to the other, means responsive to the pressure applied to said connection for varying the speed-ratio of said members, and means for varying the pressure applied to said connection for varying the speed ratio to maintain the speed of the driven member substantially constant, said last mentioned means including fluid pressure generating means driven by said connection, a pressure applying member operated thereby, and centrifugally controlled valve means driven by said connection for regulating the pressure applied to said connection.

7. In combination, a driving member, a driven member, variable speed-ratio means interconnecting said members, and means including fluid pressure generating means and centrifugally controlled valve means comprising a unitary structure and actuated by and acting upon said speed-ratio means for controlling the speed ratio.

8. In combination, a varying speed driving member, a member to be driven at a substantially constant speed, variable speed-ratio means including a variable diameter pulley and a belt interconnecting said members, and means adapted to control the force applied to said belt for varying the speed-ratio and driving said driven member at substantially a constant speed irrespective of variations in the speed of the driving member, said last mentioned means including fluid pressure generating means driven by the belt, pressure operated means for applying a variable force to the belt at a point between said members, and means in contact with and driven by the belt at a speed proportional to the speed of the driven member for controlling the pressure applied to said pressure operated means.

9. In a power transmission system, the combination including, a varying speed driving member, such member having secured thereon a pulley including a pair of pulley halves resiliently biased toward each other, a member to be driven at a substantially constant speed, a belt interconnecting said members, fluid pressure generating means operated by power derived from the belt, pressure operated means adapted to vary the pressure applied to said belt and thereby to vary the distance between the pulley halves for varying the speed ratio between said driving and driven members, valve means interposed between said pressure generating and pressure operated means for varying the pressure applied to the latter, and centrifugally operated means driven by the belt at a speed proportional to that of the driven member and adapted to control said valve means for maintaining the speed of the driven member substantially constant.

10. In a power transmission system, the combination including, a varying speed driving member, a variable diameter pulley of the type including a pair of pulley halves resiliently biased toward a maximum diameter position mounted on said member, a member to be driven at a substantially constant speed, a belt interconnecting said members for the transmission of power from one to the other, fluid pressure generating means comprising a pump having suction and outlet ports operated by the belt, means including a cylinder and associated piston acting against the force biasing said pulley halves together for varying the diameter of said pulley and thereby the speed ratio between the driving and driven members, a fluid conduit leading from the outlet port of said pump to the cylinder, a fluid reservoir, a fluid conduit connecting said reservoir to the inlet port of said pump, a bypass conduit connecting the outlet port of said pump to the fluid reservoir, valve means controlling the flow of fluid through said bypass conduit, means biasing said valve toward its open position, centrifugally operated means rotating at a speed proportional to that of the driven member and driven by the belt adapted to open said valve biasing means in response to an increase in speed above a predetermined valve whereby the pressure applied to said piston is varied to maintain the speed of the driven member substantially constant irrespective of the variation in the speed of the driving member, and a unitary support independent of the driving and driven members and interconnecting belt for the elements of the speed-ratio varying means.

11. In combination, a varying speed driving member, a member to be driven at substantially a constant speed, variable speed ratio means including a variable diameter pulley and a belt interconnecting said members, and means adapted to vary the position of the driving member with respect to said driven member for varying the diameter of said pulley and driving said driven member at a substantially constant speed irrespective of variations in the speed of the driving member, the last mentioned means including fluid pressure generating means driven through the intermediary of the driven member, pressure operated means for varying the position of the driving member with respect to the position of the driven member, and means rotating with the driven member for controlling the pressure applied to said pressure operated means.

12. In a power transmission system, the combination including, a varying speed driving member, a pulley of the type comprising a pair of pulley halves resiliently biased toward each other secured on said member, a member to be driven at a substantially constant speed, a belt interconnecting said members for the transmission of power from one to the other, fluid pressure generating means attached to the driven member for operation thereby, pressure operated means adapted to vary the distance between the driving and driven members thereby to vary the distance between the pulley halves for varying the speed ratio between said driving and driven members, valve means interposed between said pressure generating and pressure operated means for varying the pressure applied to the latter means, and centrifugally operated means driven by said driven member adapted to control said valve for maintaining the speed of the driven member substantially constant.

13. In a power transmission system, the combination including a varying speed driving member, a driving pulley of the type comprising a pair of pulley halves resiliently biased toward each other mounted on said member, a member to be driven at a substantially constant speed, a belt interconnecting said members for the transmission of power from one to the other, a fluid pressure generating pump of the reciprocating type having suction and outlet ports operated by power derived from the driving member through the intermediary of the belt and driven member, means including a cylinder and an associated piston for moving the axis of rotation of the driving member with respect to the axis of rotation of the driven member thereby to control the distance between the pulley halves and the speed ratio between the driving and driven members, a fluid conduit leading from the outlet port of said pump to the cylinder, a fluid reservoir, a fluid conduit connecting said reservoir to the inlet port of said pump, a bypass conduit connecting the outlet port of said pump to the fluid reservoir, valve means controlling the flow of fluid through said bypass conduit, and centrifugally operated means driven directly by the driven member for controlling the position of said valve means, said centrifugally operated means and valve means being so constructed and arranged that when the driving member is at rest the valve is open and as the speed of the driving member and driven member increases above a predetermined value the centrifugally operated means is effective gradually to close the valve to increase the pressure applied to said piston and move the driving pulley with respect to the driven member thereby to maintain substantially constant the speed of the driven member irrespective of variations in the speed of the driving member.

14. In combination, a varying speed driving member, a driving pulley of the type including a pair of pulley halves biased toward each other mounted on said member, a driven member adapted to be driven at a substantially constant speed, a driven pulley comprising a pair of pulley halves movable axially with respect to each other mounted on said driven member, a belt interconnecting said pulleys, and means adapted to control the position of the two last mentioned pulley halves with respect to each other for varying the speed ratio and for driving said driven member at a substantially constant speed irrespective of variation in the speed of the driving member, said last mentioned means including fluid pressure generating means driven by said driven member, means operable by pressure from said pressure generating means for varying the position of the two last mentioned pulley halves with respect to each other, and means driven by the driven shaft at a speed proportional thereto for controlling the pressure applied to said pressure operated means.

15. In a power transmission system, the combination including a varying speed driving member, a pulley of the type having a pair of pulley halves resiliently biased toward each other secured to said driving member, a member to be driven at a substantially constant speed, a variable diameter pulley of the type having a pair of pulley halves relatively movable axially with respect to each other secured to said driven member, a belt interconnecting said pulleys for the transmission of power from one member to the other, fluid pressure generating means operated by the driven member, pressure operated means adapted to vary the positions of the two last mentioned pulley halves with respect to each other for varying the speed ratio between the driving and driven members, valve means interposed between said pressure generating and pressure operated means for varying the pressure applied to the latter, and centrifugally operated means driven by the driven member adapted to control said valve means for maintaining the speed of the driven member substantially constant.

16. In a power transmission system, the combination including a varying speed driving member, a pair of pulley halves resiliently biased toward each other secured on said member, a member adapted to be driven at a substantially constant speed, a pulley of the type having a pair of pulley halves relatively movable axially with respect to each other mounted on said driven member, a belt interconnecting said pulleys for the transmission of power from one member to the other, a fluid pressure generating pump of the reciprocating type having suction and outlet ports operated by power derived from the driving member through the intermediary of the belt and pulleys, means including a relatively movable piston and cylinder connected to said two last mentioned pulley halves and operable to vary the distance between said halves for controlling the speed ratio between the driving and driven members, a fluid conduit leading from the outlet port of said pump to the cylinder, a fluid reservoir, a fluid conduit connecting said reservoir to the suction port of said pump, a bypass conduit connecting the outlet port of said pump to said fluid reservoir, valve means controlling the flow of fluid to said bypass conduit, and centrifugally operated means driven directly by the driven member for controlling said valve means whereby the pressure applied to said piston is varied to maintain the speed of the driven member substantially constant irrespective of the variations in the speed of the driving member above a predetermined valve, said centrifugally operated means and valve means being so constructed and arranged that the bypass conduit is open when the driving member is at rest and the conduit is gradually closed as the speed of the driven member increases above said predetermined value.

17. In combination, a varying speed driving member, a driving pulley of the type including a pair of pulley halves biased toward each other mounted on said member, a driven member adapted to be driven at a substantially constant speed, a driven pulley comprising a pair of movable pulley halves mounted on said driven member, a belt interconnecting said pulleys, and means adapted to control the position of the two last mentioned pulley halves with respect to each other for varying the speed ratio and for driving said driven member at a substantially constant speed, said last mentioned means including fluid pressure generating means driven by said driven member, a movable cylinder connected to one and a movable piston connected to the other of said two last mentioned pulley halves, said cylinder and piston defining a chamber, means connecting said chamber to said fluid pressure generating means, and means driven at a speed proportional to the driven shaft controlling the pressure applied to the chamber.

18. In combination, a varying speed driving member, a driving pulley of the type including a pair of pulley halves biased toward each other mounted on said member, a driven member adapted to be driven at a substantially constant speed and comprising a tubular portion, a driven pulley comprising a pair of movable pulley halves mounted on the tubular portion of said driven member, a belt interconnecting said pulleys, and means adapted to control the position of the two last mentioned pulley halves with respect to each other for varying the speed ratio and for driving said driven member at a substantially constant speed, said last mentioned means including fluid pressure generating means driven by said driven member, a movable cylinder connected to one and a movable piston connected to the other of said two last mentioned pulley halves, said cylinder and piston being positioned within the tubular portion of said driven member and defining a pressure chamber, a conduit movable with said piston connecting said chamber to said pressure generating means, and means driven at a speed proportional to the driven shaft controlling the pressure applied to said pressure chamber through said conduit.

19. In a power transmission system, the combination including, a power transmitting member comprising a tubular portion, a pair of movable pulley halves mounted on said tubular portion, and means for controlling the relative positions of said pulley halves, said last mentioned means comprising a cylinder movably mounted within said tubular portion and connected to one of said pulley halves, a piston movably mounted within said tubular portion and connected to the other of said pulley halves, said piston being cooperatively associated with said cylinder to define a pressure chamber, and means for applying pressure between said cylinder and piston.

20. In a power transmission system the combination including, a varying speed driving member, a pair of pulley halves resiliently biased toward each other secured to said member, a member adapted to be driven at a substantially constant speed and comprising a tubular section mounted for rotation on a pair of spaced-apart brackets, a pair of movable pulley halves mounted on said tubular portion, a belt interconnecting said pulleys for the transmission of power from one member to the other, a reversible fluid pressure generating pump operated by power derived from the driving member through the intermediary of the belt and pulleys, means including a movable piston and movable cylinder each connected to one of said two last mentioned pulley halves for controlling the speed ratio between the driving and driven members, a fluid conduit leading from the discharge side of said pump to the chamber defined by said piston and cylinder, said conduit extending through one of said spaced-apart brackets, valve means associated with said conduit for controlling the pressure in the chamber between said piston and cylinder, and centrifugally operated means driven at a speed proportional to that of the driven member for controlling said valve.

AUGUSTUS C. DURDIN, Jr.

CERTIFICATE OF CORRECTION.

Patent No. 2,308,868.                                                  January 19, 1943.

AUGUSTUS C. DURDIN, JR.

It is hereby certified that error appears in the printed specification of the above numbered patent requiring correction as follows: Page 6, second column, line 36, claim 10, and page 7, second column, line 51, claim 16, for "valve" read --value--; and that the said Letters Patent should be read with this correction therein that the same may conform to the record of the case in the Patent Office.

Signed and sealed this 30th day of March, A. D. 1943.

(Seal)

Henry Van Arsdale,
Acting Commissioner of Patents.